US012015187B2

(12) United States Patent
Yousefbeiki et al.

(10) Patent No.: US 12,015,187 B2
(45) Date of Patent: Jun. 18, 2024

(54) GLAZING UNIT WITH ANTENNA UNIT

(71) Applicants: AGC GLASS EUROPE, Louvain-la-neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

(72) Inventors: Mohsen Yousefbeiki, Gosselies (BE); Xavier Radu, Gosselies (BE); Michaël Demeyere, Forville (BE); Dan Lis, Isnes (BE); Marco Zaccaria, Namur (BE)

(73) Assignees: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 236 days.

(21) Appl. No.: 17/426,506

(22) PCT Filed: Jan. 31, 2020

(86) PCT No.: PCT/EP2020/052393
§ 371 (c)(1),
(2) Date: Jul. 28, 2021

(87) PCT Pub. No.: WO2020/157259
PCT Pub. Date: Aug. 6, 2020

(65) Prior Publication Data

US 2022/0115763 A1 Apr. 14, 2022

(30) Foreign Application Priority Data

Jan. 31, 2019 (EP) .................................... 19154767

(51) Int. Cl.
*H01Q 1/12* (2006.01)
*H01Q 1/00* (2006.01)
*H01Q 1/40* (2006.01)

(52) U.S. Cl.
CPC ........... *H01Q 1/1271* (2013.01); *H01Q 1/002* (2013.01); *H01Q 1/40* (2013.01)

(58) Field of Classification Search
CPC ........ H01Q 1/002; H01Q 1/02; H01Q 1/1271; H01Q 1/38; H01Q 1/007; H01Q 1/44
See application file for complete search history.

(56) References Cited

U.S. PATENT DOCUMENTS 5,760,744 A * 6/1998 Sauer .................. H01Q 9/0407 343/700 MS
2003/0142018 A1 7/2003 Lange
(Continued)

FOREIGN PATENT DOCUMENTS

EP 1 559 167 A1 8/2005
EP 2 833 474 A1 2/2015

OTHER PUBLICATIONS

International Search Report dated Mar. 20, 2020 in PCT/EP2020/052393 filed on Jan. 31, 2020 (4 pages).

*Primary Examiner* — Awat M Salih
(74) *Attorney, Agent, or Firm* — Oblon, McClelland, Maier & Neustadt, L.L.P.

(57) ABSTRACT

A glazing unit comprising at least a glass panel and an antenna unit. The antenna unit includes an antenna a fixing means for fixing the antenna to the glass panel so that a space S through which air can flow is formed between the glass panel and the antenna with a light transmission of at least 30%, preferably at least 50% and more preferably at least 65%.

20 Claims, 5 Drawing Sheets

(56) References Cited

U.S. PATENT DOCUMENTS

| | | | |
|---|---|---|---|
| 2006/0202897 | A1 | 9/2006 | Roquiny |
| 2016/0172765 | A1 | 6/2016 | Motta-Cruz et al. |

* cited by examiner

GLAZING UNIT WITH ANTENNA UNIT

TECHNICAL FIELD

The present invention relates to a glazing unit with an improved antenna unit.

BACKGROUND ART

Various communication systems based on wireless technologies such as cellular communication, radio broadcasting, GPS (Global Positioning System) are being developed. In order to deal with these communication systems, an antenna capable of transmitting and receiving electromagnetic waves used for each communication system is required.

In recent years, with miniaturization, antennas are increasingly installed in buildings. A large number of antennas are installed in the building so that electromagnetic waves used for mobile communications can be transmitted and received in a stable manner. When installing the antenna in the building, it is necessary to select the proper placement of the antenna so that electromagnetic waves can be transmitted and received stably while preventing the appearance of the building from being impaired.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to install a larger number of antennas in order to stably perform electromagnetic wave transmission and reception.

As an antenna unit to be installed and used in a building, for example, there are three layers having different relative dielectric constants, each layer is set to a predetermined thickness, and a radio wave transmitting body as described in the patent application JP06196915.

However, according to the technique described in JP06196915, there is a case where the temperature of the first layer excessively rises when the sunlight hits the first layer, depending on the installation place or the installation condition of the antenna unit and the like, it has not been studied that there is a possibility of thermal cracking in the first layer of the permeable member.

An object of one embodiment of the present invention is to provide a glass antenna unit capable of reducing the possibility of occurrence of thermal cracking in a glass panel.

SUMMARY OF INVENTION

It is an object of the present invention to alleviate these problems, and to provide a glazing unit which leads to a reduced back reflection from the glass panel while reducing the possibility of occurrence of thermal cracking in the glass panel while the back radiation of the waves from the structure due to reflection from the glass panel has to be minimized.

According to a first aspect of the invention, the invention relates to an improved glazing unit extending along a plane, P, defined by a longitudinal axis, X, and a vertical axis, Z; having a width, W, measured along the longitudinal axis, X, and a length, L, measured along the vertical axis, Z, comprising at least a glass panel having two majors surfaces extending along a plane, P, an outer surface and an inner surface and an antenna unit.

The solution as defined in the first aspect of the present invention is based on the antenna unit comprises an antenna and at least one fixing mean, for fixing the antenna to the glass panel so that a space through which air can flow is formed between the glass panel and the antenna, with a light transmission of at least 30%, preferably at least 50% and more preferably at least 65%.

According to the invention, the antenna unit may comprises two fixing means in order to stabilize the fixation of the antenna on the glass panel and to create a tunnel effect for the air flow.

According to the invention, the antenna unit may comprises more than two fixing means in order to maximize the stability of the fixation of the antenna on the glass panel while creating several openings to let the air flows through. Preferably, the antenna unit may comprises four fixing means.

In some embodiments, in order to have a good structural fixation while keeping the desire light transmission, the at least one fixing mean comprises a first bonding element with a transmission of at least 30%, preferably at least 50% and more preferably at least 65%, a second bonding element with a light transmission of at least 30%, preferably at least 50% and more preferably at least 65% and a structural element with a light transmission of at least 30%, preferably at least 50% and more preferably at least 65% placed between the first and the second bonding elements.

Structural is understood to mean the ability to bear loads and/or to transfer the mechanical stresses related in particular to the weight of the antenna and to the thermal expansion stresses between the antenna and the glass panel or possible dynamic movements arising from the movement of the glass panel itself, for example, when the glass panel is a window or door).

In some other embodiments, the structural element of the fixing mean may be a thermoplastic polymer.

In preferred embodiments, the structural element of the fixing mean may a glass element.

In some embodiments, the glass element may be an inorganic glass such as soda-lime glass, borosilicate glass, aluminosilicate glass.

In some preferred embodiments, the glass element may be a low-iron glass element to have a better light transmission especially for a long glass element. A low-iron glass is a glass with at most 0.01 wt % of ferric oxides.

In some embodiments, the structural element of the fixing mean is a transparent polymer which is rigid at ambient temperature and preferably a polymethyl methacrylate.

In some preferred embodiments, fixing mean comprises on at least one surface a coating system to minimize the back reflection on the glass panel of the radiation of the antenna. Preferably, the coating system is on one surface of the structural element to reduce the cost of the process of assembly.

In some preferred embodiments, the first bonding element may be an adhesive, preferably an acrylic tape and/or the second bonding element is an adhesive, preferably an acrylic tape. More preferably, the acrylic tape is a double-sided tape. Preferably, the first and the second elements may have the same transparent material.

In some preferred embodiments, the antenna may be a planar-like antenna.

In some more preferred embodiments, the antenna may comprise a glass element placed in front of the glass panel.

According to the invention, the glass panel may comprise at least one glass sheet.

In some preferred embodiments, the glass panel may comprise two glass sheets separated by a spacer. The space between these two glass sheets is filled with gas such as argon to improve the thermal insulation of the glazing unit.

In some more preferred embodiments, the glass panel comprises a coating layers system to improve the thermal insulation of the glazing unit. Preferably, to ensure the radiation of the antenna through the glass panel, the coating layers system comprises an opening in front of the antenna.

It is noted that the invention relates to all possible combinations of features recited in the claims.

The following description relates to an building window unit but it's understood that the invention may be applicable to others fields like transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
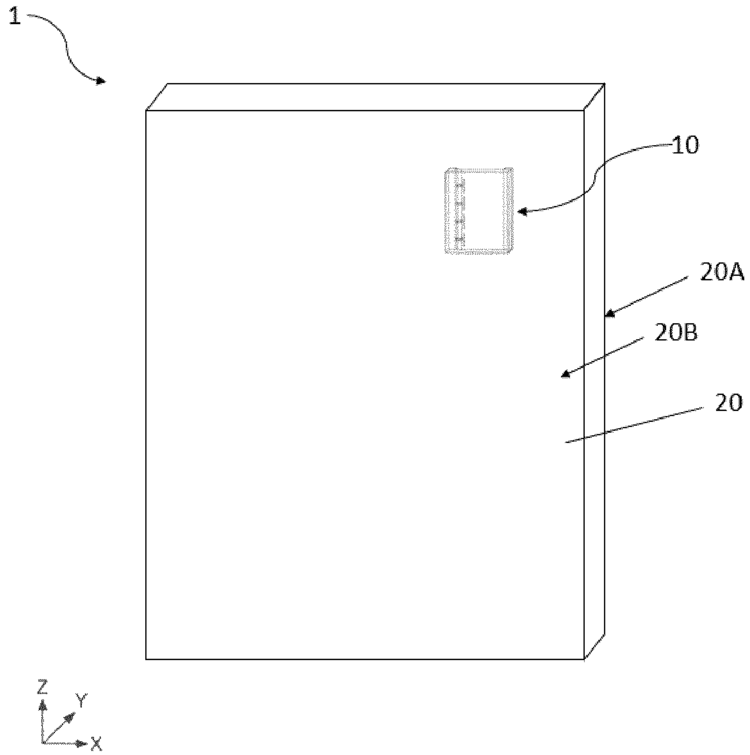
FIG. 1 is a schematic view of a glazing unit according to an exemplifying embodiment of the present invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the glass panel is defined as the X direction, the thickness direction is defined as the Y direction, and the height is defined as the Z direction. The direction from the bottom to the top of the glass panel is defined as the +Z axis direction, and the opposite direction is defined as the −Z axis direction. In the following description, the +Z axis direction is referred to as upward and the −Z axial direction may be referred to as down.

With reference to FIG. 1, a first embodiment of the present invention is described.

As shown in FIG. 1, a glazing unit 1 extending along a plane, P, defined by a longitudinal axis, X, and a vertical axis, Z; having a width, W, measured along the longitudinal axis, X, and a length, L, measured along the vertical axis, Z, comprises a glass panel 20 having two majors surfaces extending along a plane, P, an outer surface 20A and an inner surface 20B and an antenna unit 10. The antenna unit 10 is attached to the main surface on the indoor side (inner surface 20B) of the glass panel 20. Then, sunlight or the like is irradiated on the main surface of the glass panel 20 on the side opposite to the interior side (outer surface 20A).

In some embodiments, the glass panel comprises at least one glass sheet.

In some preferred embodiments, the glass panel comprises at least two glass sheets separated by a spacer allowing to create a space filled by a gas like Argon to improve the thermal insulation of the glass panel, creating an insulating glass panel. It means that, in these embodiments, the antenna unit is placed outside of the insulating glass panel on the glass face the most far from the outside face where the sun is directly heating.

The glass panel 20 is a known glass plate used for a window of a building or the like. The glass panel 20 is formed in a rectangular shape in plan view and has a first main surface and a second main surface. The thickness of the glass panel 20 is set according to requirements of buildings and the like.

In some embodiments, the first main surface of the glass panel 20 is set to the outdoor side and the second main surface is set to the indoor side (facing the antenna 11).

In the present embodiment, the first main surface and the second main surface are collectively referred to simply as the main surface in some cases. In the present embodiment, the rectangle includes not only a rectangle or a square but also a shape obtained by chamfering corners of a rectangle or a square. The shape of the glass panel 20 in a plan view is not limited to a rectangle, and may be a circle or the like. Further, the glass panel 20 is not limited to a single plate, and it may be a laminated glass or a double-layered glass.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

As the material of the glass panel 20, for example, soda-lime silica glass, borosilicate glass, or aluminosilicate glass can be mentioned.

The glass panel 20 can be manufactured by a known manufacturing method such as a float method, a fusion method, a redraw method, a press molding method, or a pulling method. As a manufacturing method of the glass panel 20, from the viewpoint of productivity and cost, it is preferable to use the float method.

The glass panel 20 can be formed in a rectangular shape in a plan view by using a known cutting method. As a method of cutting the glass panel 20, for example, a method in which laser light is irradiated on the surface of the glass panel 20 to cut the irradiated region of the laser light on the surface of the glass panel 20 to cut the glass panel 20, or a method in which a cutter wheel is mechanically cutting can be used.

The glass sheet can be a clear glass or a coloured glass, tinted with a specific composition of the glass or by applying a coating or a plastic layer for example.

In order to minimize the heat inside the building and inside the space S between the antenna 12 and the glass panel 20, the glass panel 20 may be provided with a coating layers system having a heat ray reflecting function and the like on the second main surface on the interior side (inner surface 20A) of the glass panel 20.

In this embodiment, the coating layers system preferably has an opening at a position facing the antenna unit of the antenna unit 10. Thereby, the glass panel with an antenna can suppress deterioration of the radio wave transmission performance.

The opening can be a surface without the coating layers system or a plurality of small slits or any shape in the coating layers system to become a frequency selective surface in order to let waves circulate from one side to the other side of the glass panel and can further suppress deterioration of radio wave transmission performance.

As the coating layers system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

The glass sheet can be processed, ie annealed, tempered, . . . to respect with the specifications of security and anti-thief requirements. A heatable system, for example a coating or a network of wires, can be applied on the glazing unit to add a defrosting and/or a demisting function for example.

In case of several glass sheets, in some embodiments, each glass sheet can be independently processed and/or coloured, . . . in order to improve the aesthetic, thermal insulation performances, safety, . . . .

As shown in FIGS. 2 to 5, the antenna unit 10 comprises at least one fixing mean 13, 13A, 13B for fixing the antenna 12 to the glass panel so that a space S through which air can flow is formed between the glass panel 20 and the antenna 12.

In addition, the glazing unit 1 can be assembled within a frame or be mounted in a double skin facade or any other means able to maintain a glazing unit.

According to some embodiments according to the invention, the antenna 12 can be a flat plate-like substrate on which the antenna 12 is provided. For instance, the antenna 12 can be a planar antenna like the microstrip patch array, slot array, a dipole antenna, an array of antennas, or the like can be used.

As the metal material forming the antenna 12, a conductive material such as gold, copper, nickel or silver can be used.

According to the invention, the antenna 12 may radiate in the direction of outside (−Y), meaning to the direction of the glass panel, in the direction of inside (+Y), meaning to the opposite direction of the glass panel or in both directions (+Y, −Y).

In some embodiments, the antenna 12 can be provided on a first main surface of the antenna installation substrate. The antenna 12 can be formed by printing a metal material so as to at least partially overlap a ceramic layer provided on the second main surface of the antenna installation substrate. In that embodiment, the antenna 12 is provided on the second main surface of the antenna installation substrate so as to straddle the portion where the ceramic layer is formed and the other portion.

In this embodiment, the ceramic layer can be formed on the second main surface of the antenna installation substrate by a known method such as printing. By providing the ceramic layer, the wiring (not shown) attached to the antenna 12 can be covered or hidden to have a better finish and/or design. Further, in the present embodiment, the ceramic layer is formed on the first main surface but may not be provided.

In the present embodiment, the antenna 12 is provided on the first main surface of the antenna installation substrate, but may be provided inside the antenna installation substrate. In this case, for example, the antenna 12 can be provided inside the antenna installation board in the form of a coil. Further, the antenna 12 itself may be formed in a flat plate shape. In this case, instead of using the antenna mounting board, a flat plate antenna may be directly attached to the fixing mean 13A. The antenna 12 may be provided inside the accommodation container having a surface parallel to the glass panel 20, in addition to being provided on the antenna installation substrate 12. In this case, in the antenna 12, for example, a flat antenna can be provided inside the storage container.

The antenna 12 preferably has optical transparency to be as discrete as possible. If the antenna 12 has optical transparency, the average solar radiation absorption rate can be lowered on top of the hidden effect.

Preferably, the antenna 12 or the antenna installation substrate is provided in parallel to the glass panel 20. The antenna 12 or the antenna installation substrate can be formed in a rectangular shape in a plan view and has a first main surface and a second main surface. The first main surface is provided so as to face the main surface of the glass panel 20 to be attached and the second main surface is provided in a direction opposite to the main surface side of the glass panel 20.

In some embodiments, the material for forming the antenna installation board is designed according to the antenna performance such as power and directivity required for the antenna 12, and for example, glass, resin, metal, or the like can be used. The antenna installation substrate may be formed to have light transmittance by resin or the like. Since the antenna mounting board 12 is made of a light transmissive material, the glass panel 20 can be seen through the antenna installation board 12, so that it is possible to reduce the obstruction of the field of view seen from the glass panel 20.

The thickness of the antenna installation board can be designed according to the place where the antenna 12 is arranged.

The at least one fixing mean has a light transmission of at least 30%, preferably at least 50% and more preferably at least 65% in order to reduce the absorption of heat and the possibility of occurrence of thermal cracking in a glass panel while maximizing the visual transparency through the glazing unit 1 and keeping a good aesthetic. Thus, more transparent is the antenna unit, especially the at least one fixing mean, the more transparent is the view through the glazing unit 1 meaning that the antenna unit is more discreet while keeping his performances.

The light transmission is measured in the Y axis and is the light transmission in the visible spectrum. The light transmission of the glass panel is measured from the outer surface 20A of the glass panel to the opposite surface to the glass panel of the antenna 12 or from the opposite surface to the glass panel of the antenna 12 to the outer surface 20A of the glass panel. The light transmission of the fixing mean is measured in the Y axis. The higher the light transmission is, the more transparent is the fixing mean.

Figure 2:
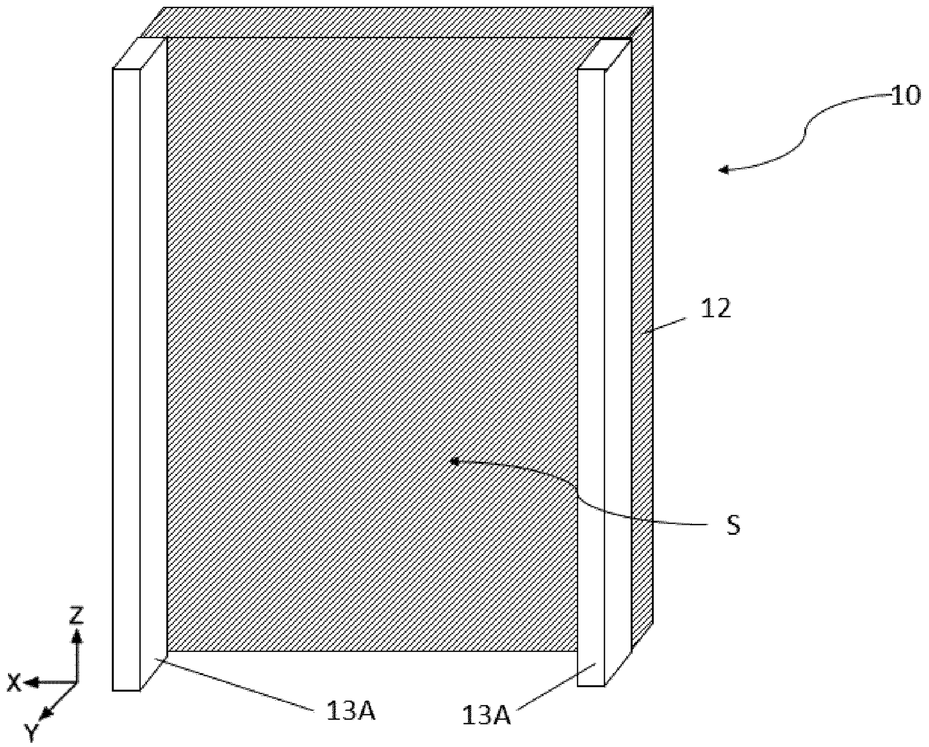
FIG. 2 is a schematic view of an antenna unit according to the invention with two fixings means.

As shown in FIG. 2, the at least one fixing mean 13A is for forming a space S through which air can flow between the glass panel 20 and the antenna 12 and is for fixing the antenna 12 to the glass panel 20. The fixing mean 13A is attached to the first main surface of the antenna installation substrate 12. In the present embodiment, the fixing mean 13A is provided in a rectangular shape along the Z-axis direction at both ends in the X-axis direction of the antenna installation substrate. In the present embodiment, the reason why the space S through which air flows is formed between the glass panel 20 and the antenna 12 is that the local temperature of the surface temperature of the glass panel 20 at the position facing the antenna 12. When the outer main surface of the glass panel 20 is irradiated with sunlight, the glass panel 20 is heated. At this time, if the flow of air is blocked in the vicinity of the antenna unit 10, the temperature of the antenna unit 10 rises, so that the temperature of the surface of the glass panel 20 to which the antenna unit 10 is attached is higher than the temperature of the other surface The temperature tends to rise more easily. In order to suppress this temperature rise, a space S is formed between the glass panel 20 and the antenna 12. Details regarding this point will be described later.

In these embodiment, the transparency and the light transmission is measured from one of these faces to the other one meaning the light transmission is measured in the edge (Y axis) of the at least one fixing mean.

The material for forming the fixing mean 13, 13A, 13B is not particularly limited as long as it can be fixed to the contact surface of the antenna 12 and the glass panel 20. For example, an adhesive or an elastic seal can be used. Materials for forming adhesives and sealing materials.

The average thickness t of the fixing mean 13, 13A, 13B is preferably 0.5 mm to 20 mm. If the average thickness t is too small, the thickness of the space S formed by the antenna 12 and the glass panel 20 becomes small (thin), and the air does not smoothly flow through the space S. By making the space S between the antenna 12 and the glass panel 20 slight, the thickness of the space S becomes thin, but the space S can function as a heat insulating layer. Even if the thickness of the space S is small, a certain amount of air flows. That is, when sunlight is irradiated on the glass panel 20, the temperature of the glass panel 20 rises, and the temperature of the air in the space S also rises. As the temperature of the air rises, the air expands more, so that the upper air in the space S rises and flows out from the upper side of the space S to the outside. Then, the air sequentially rises from the lower side in the space S. Therefore, even when the thickness of the space S is small, the air tends to flow as the temperature of the air in the space S rises.

On the other hand, when the average thickness t of the fixing mean 13, 13A, 13B is increased, the space S is increased (thickened) by that much, so that the air flow in the space S is preferable. However, since the distance between the main surface of the glass panel 20 and the antenna 12 increases (increases), there is a possibility that the electromagnetic wave transmission performance may be hindered. Further, since the antenna unit 10 protrudes largely from the main surface of the glass panel 20, the antenna unit 10 becomes an obstacle to the glass panel 20.

Figure 3:
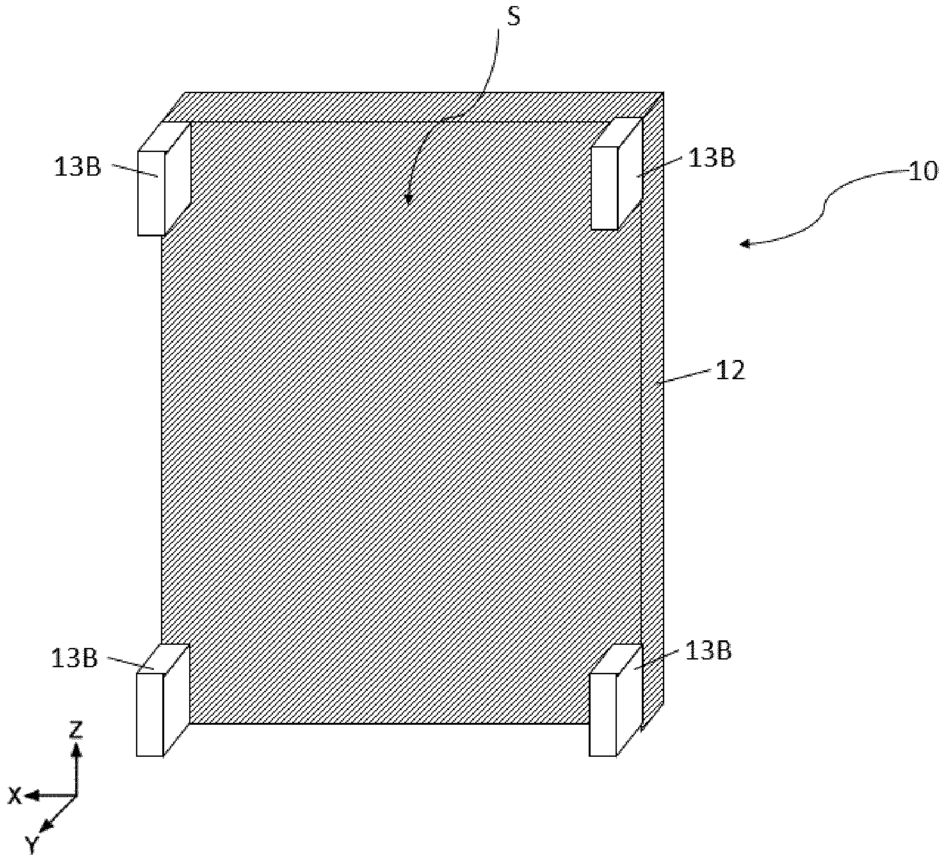
FIG. 3 is a schematic view of embodiments of an antenna unit with four fixing means.
Figure 4:
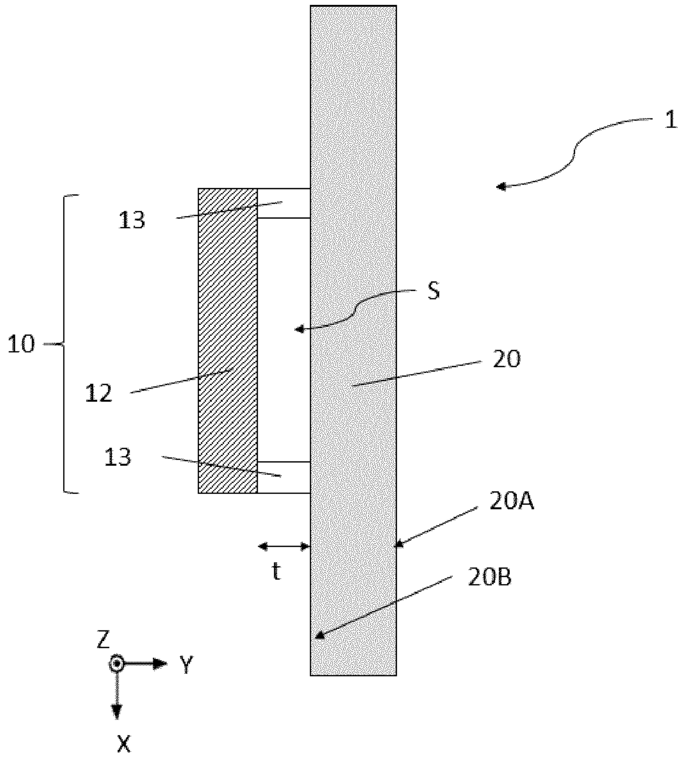
FIG. 4 is a schematic view of embodiments of a glazing unit comprising an antenna unit.
Figure 5:
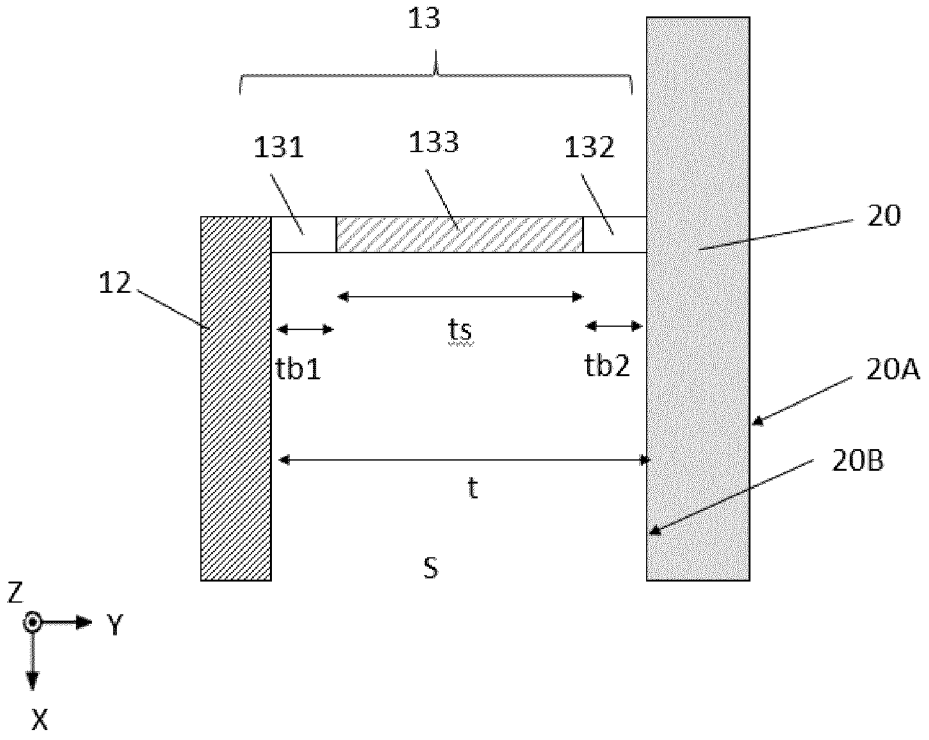
FIG. 5 is a schematic view of one embodiment of an antenna unit with a first and a second bonding elements and a structural element.

Although the embodiment in which the fixing mean 13, 13A, 13B is provided at two locations of the antenna 12 has been described so far, the mode of the fixing mean 13A is not limited as long as the air can flow in the space S. An example of another form of the fixing mean 13B. As is shown in FIG. 5, the fixing mean can have another form. According to the invention, the fixing mean 13B is provided at both ends in the X-axis direction of the first main surface of the antenna 12 and at both ends in the Z-axis direction, respectively, and the antenna 12 is fixed to the glass panel with four fixing means Further, among the four fixing means 13B, only one fixing mean 13 B provided in the −Z axis direction is provided at the lower end of the antenna installation substrate 12, for example, near the centre, and the antenna installation substrate 12 is fixed to the glass panel 20 by three It may be fixed by the portion 13B. It is understood that a plurality of small fixing means can be used instead of long fixing means as shown in FIGS. 3 and 4.

When the average thickness t of the fixed portion 13A is within the above range, the air flowing into the space S can pass through the space S due to a slight increase in temperature. As a result, the glass panel 20 can be prevented from being heated by the air flowing in the space S, so that excessive temperature rise of the antenna 12 can be suppressed. The average thickness t of the fixing mean 13, 13A, 13B is more preferably 2 mm to 16 mm, further preferably 4 mm to 14 mm, and particularly preferably 6 mm to 12 mm.

In the present embodiment, the thickness refers to the length in the vertical direction (Y axis direction) of the fixed portion 13A with respect to the contact surface of the antenna 12 and the glass panel 20 in which the light transmission is measured. In the present embodiment, the average thickness t of the fixed portion 13A is an average value of the thickness of the fixed portion 13A. For example, when measured in several places (for example, about three places) at an arbitrary place in the Z axis direction in the cross section of the fixed part 13A, it means the average value of the thicknesses of these measurement points.

As described above, the space S is formed between the glass panel 20 and the antenna 12 by the fixing mean 13, 13A, 13B and allows air to flow. Therefore, the thickness of the space S is substantially the same as the average thickness t of the fixed portion 13A.

In the antenna unit 10, air flows into the space S from the lower side (−Z axis direction) of the antenna 12. The air flowing into the space S can freely flow in the space S toward the upper side (+Z axis direction) of the antenna 12. The air flowing through the space S flows out from the upper side (+Z axis direction) of the antenna 12 while contacting the main surface of the glass panel 20 at a position facing the antenna 12. By contacting the air in the space S with the main surface of the glass panel 20 at a position facing the antenna 12, the main surface of the glass panel 20 at the position facing the antenna 12 is exposed to outside air and the sun excessive temperature rise due to light etc. is suppressed. In addition, since the fixing mean 13, 13A, 13B is continuously formed in the vertical direction, the temperature difference between the upper portion and the lower portion in the space S is increased accordingly. Therefore, due to the so-called chimney effect, the flow velocity of the air flowing in the space S can be increased.

In the antenna unit 10, a fixing mean 13, 13A, 13B is provided on the antenna 12 so that a space S through which air can flow is formed between the glass panel 20 and the antenna 12. Thus, even if the glass panel 20 is heated by outside air, sunlight, or the like, excessive temperature rise of the main surface of the glass panel 20 at the position facing the antenna 12 can be suppressed. Therefore, it is possible to reduce the possibility of occurrence of thermal cracks in the glass panel 20 at the position facing the antenna 12. Therefore, the antenna unit 10 can be stably installed on the glass panel 20 without causing damage to the glass panel 20.

In some embodiments, the fixing mean can let air flow by using holes, small elements instead of large ones, . . . .

The antenna 12 is preferably provided at a position separated from the glass panel 20 by a predetermined distance t or more in plan view. The predetermined distance t is preferably 20 mm. For example, when the glass sheet is directly exposed to the sunlight, the temperature of the glass panel 20 rises to a high temperature. In some cases, there is a possibility that thermal cracks may occur in the portion of the glass panel or the vicinity thereof located at the position facing the antenna unit 10. In particular, by attaching the antenna unit 10 to the second main surface of the glass panel 20, the flow of air on the second main surface of the glass panel 20 at a position facing the antenna unit 10 is hindered. In this case, the temperature of the portion of the glass panel 20 located opposite the antenna unit 10 is further increased. As a result, there is a possibility that the thermal distortion occurring in the portion of the glass panel 20 at the position facing the antenna unit 10 or in the vicinity thereof may be further increased.

The predetermined distance t is more preferably 25 mm, further preferably 30 mm, particularly preferably 40 mm, most preferably 50 mm.

According to the invention, as shown in FIG. 5, the at least one fixing mean comprises a first bonding element 131 with a light transmission of at least 30%, preferably at least 50% and more preferably at least 65%, a second bonding element 132 with a light transmission of at least 30%, preferably at least 50% and more preferably at least 65% and a structural element 133 with a light transmission of at least 30%, preferably at least 50% and more preferably at least 65% placed between the first and the second bonding elements.

Preferably, the thickness of the first and/or the second bonding elements in Y axis is between 0.5 and 4 mm.

According to the invention, the structural element of the fixing mean can be a transparent polymer which is rigid at ambient temperature. "Polymer which is rigid at ambient temperature" is understood to mean a polymer, the glass transition temperature Tg of which is at least 50° C. Preferably, the polymer chosen has a Tg of at least 65° C. Most preferably, the polymer has a Tg of at least 80° C. Examples of such polymers are a polymethyl methacrylate (PMMA), a polycarbonate (PC), a polystyrene (PS), a polyvinyl chloride (PVC), a polyamide (PA), a polyetherimide (PEI), a polyethylene terephthalate (PET), a styrene/acrylonitrile (SAN) copolymer, a poly(acrylonitrile-co-butadieneco-styrene) (ABS) or a blend of these compounds. Preferably. the transparent and rigid polymer is chosen from a PMMA, a PC, a PS, a PVC, an ABS, a PA or a blend of these compounds or any other polymer with a light transmission of at least 30%, preferably at least 50% and more preferably at least 65% able to be structural. More preferably still, the structural element is formed from PMMA or from PC. These polymers are characterized by a high transparency and a high processability. The term "polymer" covers in this instance both polymers and copolymers.

In some embodiments to improve the adhesion of the fixing mean to the antenna and/or to the glass panel, a primer could be used.

In some embodiments to improve the adhesion of the bonding element because some plastic materials have low surface tension, therefore, not great for sticking, a primer could be used to improve the adhesion between the first bonding element and the glass panel and/or between the second bonding element and the antenna and/or between bonding elements and the structural element.

According to the invention, the structural element of the fixing mean can be a glass element in order to reduce thermal expansion stresses and in order to reduce risk of breakage of the glass panel and/or the antenna unit. In some embodiments, the glass element may be an inorganic glass such as soda-lime glass, borosilicate glass, aluminosilicate glass. Preferably, the glass element is a soda-lime glass to have a similar thermal expansion than the glass panel.

To maximize the light transmission thought the structural element, a low-iron soda lime glass can be used.

According to another embodiment of the glazing unit, also compatible with the preceding embodiments, the first and/or the second bonding elements is an transparent adhesive. The adhesive can be a glue or a transparent material consisting, for example, of a double-sided adhesive tape made of acrylic polymer, made of rubber or made of silicone, a polyisobutylene-based adhesive or an adhesive of crosslinkable acrylic or crosslinkable epoxy type. Preferably. a double-sided adhesive tape made of acrylic polymer is used.

Crosslinkable" is understood to mean the fact of forming a three-dimensional network of polymer chains under the action of ultraviolet radiation, of moisture or of a curing agent. These materials. in addition to being transparent, exhibit a good performance in terms of tightness to water vapour and gases and in addition exhibit good adhesion to the glass while withstanding ultraviolet rays.

In preferred embodiments, the first and the second bonding elements are made with same material to ensure the good adhesion and reduce thermal expansion stress while keeping the same transparency.

In some preferred embodiments, the structural element is larger (in Y axis direction) than the first and the second bonding elements. The distance between the antenna 12 and the glass panel 20 is the sum of the thickness of the structural element, ts, and the thicknesses of the first 131 and the second 132 bonding elements, respectively tb1 and tb2 (t=ts+tb1+tb2). The thickness of the structural element, ts, is at least five times thicker than the smaller thickness between the thickness of the first and the second bonding element, respectively tb1 or tb2 (ts≥5×(tb1 or tb2)), preferably thickness of the structural element, ts, is at least seven times thicker than the smaller thickness between the thickness of the first and the second bonding element, respectively tb1 or tb2 (ts≥7×(tb1 or tb2)) and more preferably, thickness of the structural element, ts, is at least ten times thicker than the smaller thickness between the thickness of the first and the second bonding element, respectively tb1 or tb2 (ts≥10×(tb1 or tb2)) to have the most structural effect for the fixing mean.

In a more preferred embodiment, the glass antenna is a planar-like antenna with a two fixing means with a parallelepiped rectangular shape along the Z-axis direction at both ends in the X-axis direction of the antenna. Fixing means comprises doubled-side adhesive tape made of acrylic polymer as first and second bonding elements and comprises a soda lime glass as a structural element. The two bonding elements have a thickness of about 2 mm and the structural element is about 20 mm.

Since the glass panel 20 is provided with the antenna unit 10, it is possible to reduce the possibility of occurrence of thermal cracks in the portion of the glass panel 20 located opposite the antenna unit 10 while minimizing the back reflection of the glass panel 20 in the portion of the glass panel located opposite the antenna unit 10. Therefore, the glass panel 20 with an antenna can be suitably used as a glass panel for a window glass of existing or new buildings, houses and the like.

Further, in a glazing unit according to the invention, the antenna unit 10 can be provided on the second main surface on the indoor side of the glass panel 20. Thereby, it is possible to prevent the antenna unit 10 from damaging the external appearance of the building, and it is possible to prevent the antenna unit 10 from being exposed to the outside air, so that the durability can be improved. Furthermore, in the glass panel 20 with an antenna, the antenna unit 10 is provided on the upper side of the glass panel 20 and on either one of the left and right sides. Therefore, by passing the wiring connected to the antenna of the antenna unit 10 from the glass panel to the ceiling back side, the wall, etc., it is possible to reduce the number of wires exposed to the glass panel 20 and the wall inside the building interior it can.

Further, since the antenna unit 10 is provided on the glass panel 20, there is no need to provide the glass panel 20 with the antenna on the roof of the building or the like. Therefore, since the glass panel 20 with an antenna can be made unnecessary for installation at a high place such as the roof of a building, it can be easily installed in a building. Further, for example, even when the antenna unit 10 is broken and needs to be replaced, the antenna unit 10 can be replaced easily in a short time.

The invention claimed is:

1. A glazing unit, extending along a plane, P, defined by a longitudinal axis, X, and a vertical axis, Z; having a width, W, measured along the longitudinal axis, X, and a length, L, measured along the vertical axis Z, comprising:

- a glass panel having two major surfaces extending along a plane, P, the two major surfaces being an outer surface and an inner surface, and
- an antenna unit,
- wherein the antenna unit comprises:
  - an antenna and,
  - at least one fixing means for fixing the antenna to the glass panel so that a space through which air can flow is formed between the glass panel and the antenna, with a light transmission in a visible spectrum of at least 30%, and
- wherein the at least one fixing means comprises:
  - a first bonding element with a light transmission in the visible spectrum of at least 30%,
  - a second bonding element with a light transmission in the visible spectrum of at least 30%, and
  - a structural element with a light transmission in the visible spectrum of at least 30%, placed between the first and the second bonding elements.

2. The glazing unit according to claim 1, wherein the antenna unit comprises two fixing means.

3. The glazing unit according to claim 1, wherein the antenna unit comprises four fixing means.

4. The glazing unit according to claim 3, wherein the antenna is planar-like antenna.

5. The glazing unit according to claim 4, wherein the antenna comprises a glass element placed in front of the glass panel.

6. The glazing unit according to claim 4, wherein the light transmission in the visible spectrum of the at least one fixing means is at least 50%.

7. The glazing unit according to claim 4, wherein the light transmission in the visible spectrum of the at least one fixing means is at least 65%.

8. The glazing unit according to claim 3, wherein the first and second bonding elements are made of the same transparent material.

9. The glazing unit according to claim 1, wherein the structural element of the at least one fixing means is a glass element.

10. The glazing unit according to claim 5, wherein the glass element is a soda-lime glass.

11. The glazing unit according to claim 9, wherein the glass element comprises a low-iron soda-lime glass.

12. The glazing unit according to claim 1, wherein the structural element of the at least one fixing means is a transparent polymer which is rigid at ambient temperature.

13. The glazing unit according to claim 12, wherein the transparent polymer is a polymethyl methacrylate.

14. The glazing unit according to claim 1, wherein a surface of the at least one fixing means comprises a coating system.

15. The glazing unit according to claim 1, wherein at least one of the first bonding element and the second bonding element is an adhesive.

16. The glazing unit according to claim 1, wherein the glass panel is at least partially covered by a coating system.

17. The glazing unit according to claim 16, wherein the coating system has an opening in front of the antenna unit.

18. The glazing unit according to claim 1, wherein the light transmission in the visible spectrum of the first bonding element, the second bonding element, and the structural element is at least 50%.

19. The glazing unit according to claim 1, wherein the light transmission in the visible spectrum of the first bonding element, the second bonding element, and the structural element is at least 65%.

20. The glazing unit according to claim 1, wherein a thickness of the structural element along a direction perpendicular to both the longitudinal axis X and the vertical axis Z is at least five times thicker than a thickness of the first bonding element along the direction perpendicular to both the longitudinal axis X and the vertical axis Z, and the thickness of the structural element along the direction perpendicular to both the longitudinal axis X and the vertical axis Z is at least five times thicker than a thickness of the second bonding element along the direction perpendicular to both the longitudinal axis X and the vertical axis Z, and

- wherein a first end of the first bonding element in the direction perpendicular to both the longitudinal axis X and the vertical axis abuts the antenna, a second end of the first bonding element in the direction perpendicular to both the longitudinal axis X and the vertical axis Z is connected to a first end of the structural element in the direction perpendicular to both the longitudinal axis X and the vertical axis Z, a first end of the second bonding element in the direction perpendicular to both the longitudinal axis X and the vertical axis Z in connected to a second end of the structural element in the direction perpendicular to both the longitudinal axis X and the vertical axis Z, and a second end of the second bonding element in the direction perpendicular to both the longitudinal axis X and the vertical axis Z abuts the inner surface of the glass panel.

* * * * *